(12) United States Patent
Heide et al.

(10) Patent No.: US 11,273,984 B2
(45) Date of Patent: Mar. 15, 2022

(54) STORING, RETRIEVING OR MOVING CONTAINERS IN A HIGH-BAY WAREHOUSE

(71) Applicants: Carsten Heide, Neptphen (DE); Volker Brueck, Mudersbach (DE); Michel Bannert, Siegen (DE)

(72) Inventors: Carsten Heide, Neptphen (DE); Volker Brueck, Mudersbach (DE); Michel Bannert, Siegen (DE)

(73) Assignee: SMS LOGISTIKSYSTEME, Netphen (DE)

( * ) Notice: Subject to any disclaimer, the term of this patent is extended or adjusted under 35 U.S.C. 154(b) by 291 days.

(21) Appl. No.: 16/541,902

(22) Filed: Aug. 15, 2019

(65) Prior Publication Data
US 2021/0047114 A1  Feb. 18, 2021

Related U.S. Application Data

(63) Continuation of application No. 15/100,530, filed on Jun. 2, 2016, now abandoned.

(51) Int. Cl.
*G06F 7/00* (2006.01)
*B65G 1/137* (2006.01)

(52) U.S. Cl.
CPC .................. *B65G 1/1373* (2013.01)

(58) Field of Classification Search
CPC .. B65G 1/1373; B65G 63/004; B65G 1/0407; B66F 9/141; B66F 9/186; B66F 9/07
USPC ................................................. 700/213–218
See application file for complete search history.

(56) References Cited

U.S. PATENT DOCUMENTS

| | | | | |
|---|---|---|---|---|
| 4,007,843 A | * | 2/1977 | Lubbers | B65G 1/0414 414/273 |
| 5,380,138 A | * | 1/1995 | Kasai | B23P 19/001 221/134 |
| 2005/0264700 A1 | | 12/2005 | Matsu | |
| 2007/0070978 A1 | | 3/2007 | Bell et al. | |
| 2009/0310030 A1 | | 12/2009 | Litwin et al. | |
| 2010/0265400 A1 | | 10/2010 | Heider | |
| 2011/0096243 A1 | | 4/2011 | Casagrande | |
| 2017/0240356 A1 | * | 8/2017 | Benedict | B65G 1/0464 |

(Continued)

FOREIGN PATENT DOCUMENTS

| | | |
|---|---|---|
| DE | 9321200 U1 | 9/1996 |
| FR | 2685845 A1 | 7/1993 |

(Continued)

*Primary Examiner* — Yolanda R Cumbess
(74) *Attorney, Agent, or Firm* — Andrew Wilford

(57) ABSTRACT

Containers can be stored, retrieved, or moved in multilevel storage racks of a transfer facility by storage and retrieval units that can travel in aisles extending parallel to respective rows of compartments of storage units of the multilevel storage rack that, for longitudinal side storage of the containers, has a plurality of storage units of a depth corresponding to a container width that are consecutively arranged in rows longitudinally of the containers along one aisle side and are each separated transversely by one aisle. The storage and retrieval units can move back forth in the aisles and have raisable and lowerable telescopic grabs that can be extended and retracted transversely to the aisles for suspending a container. Corners supports in each of the compartments support the containers only at corners of the containers.

17 Claims, 4 Drawing Sheets

(56) References Cited

U.S. PATENT DOCUMENTS

| | | | |
|---|---|---|---|
| 2019/0270591 A1* | 9/2019 | Lert, Jr | B65G 1/0435 |
| 2020/0277137 A1* | 9/2020 | Bastian, II | B66F 9/065 |
| 2021/0147204 A1* | 5/2021 | Hofmann | B65G 1/0407 |

FOREIGN PATENT DOCUMENTS

| | | | |
|---|---|---|---|
| JP | 58-96005 A | 6/1983 | |
| JP | 08-099701 A | 4/1996 | |
| JP | 08198408 A | 8/1996 | |
| JP | 10045215 A | 2/1998 | |
| KR | 2001-0001018 U | 1/2001 | |

* cited by examiner

STORING, RETRIEVING OR MOVING CONTAINERS IN A HIGH-BAY WAREHOUSE

CROSS REFERENCE TO RELATED APPLICATIONS

This application is a continuation of U.S. patent application Ser. No. 15/100,530 filed 31 May 2016 as the US-national stage of PCT application PCT/EP2015/050871 filed 19 Jan. 2015 and claiming the priority of German patent application 102014203006.4 itself filed 19 Feb. 2014.

FIELD OF THE INVENTION

The invention relates to a method and apparatus for storing, retrieving, or moving containers in tall rack storage systems of a transfer facility, more particularly a sea port or an inland port where the containers are moved about as well as stored and retrieved by storage and retrieval units. These units can travel in aisles extending parallel to storage bays of the tall-rack storage system that are on a number of levels in the storage system.

BACKGROUND OF THE INVENTION

Known through EP 1 272 414 (US 2003/0047529) is a transfer facility at a sea port and inland port for, in particular, standard containers such as 20 TEU or 40 TEU containers, with a container storage rack of individual row-like storage modules provided along a quay and with at least one loading apparatus interacting with the storage modules for transferring cargoes from and to a ship moored at the quay. The loading apparatus for transferring cargoes is equipped with at least one mobile port crane. Its cargo boom extends to the transfer area of the container storage rack comprising a number storage modules provided with container rows dependent on the module width, forming an interface between the port mobile crane and the storage modules of the container store.

A container placed on the transfer area by the pivoting boom of the mobile port crane is grasped by a stacking crane that carries out the horizontal transportation and stacking of the containers. The stacking crane is designed as an upright gantry crane with crane trolley and spans a storage module, for example nine containers wide and three to four containers high, of the container storage rack extending at right angles to the quay. The storage modules are interlinked by at least two independently acting lateral transporters moving in different horizontal planes perpendicular to the individual storage modules. The containers are stacked on top of each other in the bays of the storage modules of the container store, which prevents effective storage and retrieval.

From DE 10 2008 007 860 it is known to storage rack and retrieve any number of containers on top of or next to each other individually in bays, thereby making moving of the containers in any sequence possible. For this, in view of the limited area available in port terminals, and to avoid their expansion, portal cranes are used that allow more closely spaced storage of the containers than in the aisles used by floor-going stackers or storage and retrieval units. The containers are arranged with a slight space on top of each other and individually accessible in the bays that in the direction of the interior of the bay are equipped with rails on both sides corresponding to the width of the container place with their intake end in the bay. The gantry crane that can travel over the aisles carries a container grab that can be raised and lowered by cables that is on a transfer bridge equipped with rails and at its ends has motor or hydraulically height-adjustable container grips that can be locked on suspension points of the containers at the corners, and the containers can be placed on transverse beams arranged in the bay and/or picked up from them. For the storage and retrieving of containers, the container grabs are traveled over on alternate sides over driven rollers on the tracks of the bays in their longitudinal direction over the entire bay depth. For adaptation to the different container lengths the container grab has length-adjustable transverse beams on which the container grips are provided.

OBJECT OF THE INVENTION

The object of the invention is to provide a method and a device with which in multilevel storage racks of this type transport use can be reduced and access to every individual container can also be achieved with floor-going stackers in a narrow multilevel storage bay.

SUMMARY OF THE INVENTION

This object is attained in accordance with the invention through a method that is characterized in that raisable and lowerable telescopic grabs of the storage and retrieval unit telescopically store the containers, with their longitudinal sides outward in the bays without projecting beyond the footprint or removed from them and telescopically moved back into the transfer position in the storage and retrieval unit. During this the containers are preferably suspended by the extended telescopic grabs, and brought out of the the respective storage bays and advantageously only supported there on their corners. On retrieval from the bay the containers are again preferably suspended and through retraction of the telescopic grabs brought into their retracted starting position in the transfer position flush with the contour of the storage and retrieval unit, i.e. with their narrow ends parallel to the aisles.

A great advantage of this method of storing and retrieving containers is that longitudinal side storing and retrieval in interaction with the extension and retraction of the telescopic grabs with the containers suspended thereon in bursts allows an extremely space-saving design of the multilevel storage rack with the smallest possible width dimensions of the aisles. These only have to be slightly wider than the width of the container in order to ensure traveling past the storage modules with the bays. The storage and retrieval units can therefore be compact and require no additional space-occupying projecting boom or gripper arm for storing and or retrieving or stacking or moving. The broadest contour of the storage and retrieval unit largely corresponds to the container width without an overhang. Right from the start of the handling movement when the telescopic grabs extend and enter into the bay with the container with increasing horizontal displacement until the final storage position is reached.

Advantageously the method is characterized in such a way through a storage process that
at the intake end of the multilevel storage rack the containers are made available with their longitudinal axis extending parallel to the multilevel storage rack on a side next to the aisles
subsequently a storage and retrieval device displaceable in the aisle is moved to outward of the container to be retrieved and picks up the locked container via its suspension point, for which, through a handling movement orthogonal to the aisle, telescoping grabs equipped with latches are extended out of the storage and retrieval unit up to above the container suspension point and lowered for locking, after locking, the telescopic grabs with the suspended containers are raised and are retracted through an opposite handling movement into the storage and retrieval unit until the container assumes a suspended position or transfer position in the bay in a plane flush with the aisle.

subsequently the storage and retrieval unit is displaced in the aisle to a bay to be filled and the telescopic grabs, which are preferably on a lifting bridge, are raised vertically if the bay is at a higher level, the container pre-positioned in this way is introduced into the bay by a handling movement of the telescopic grab orthogonally of the aisle, the container is then placed with its container corner area on the corner supports on the vertical posts of the storage module defining the bays, and after releasing the container the telescopic grabs are raised and moved back into their retracted starting positions.

During the retrieval or moving of a container e.g. changing the storage position within a storage module or into a different aisle, in order to improve throughput, the telescopic grabs are moved out of the storage and retrieval unit into their holding position in the bay. The fully automatically handling and travel as well as locking movements are the reverse of the storage procedure described above.

A device according to the invention, more particularly for implementing the method envisages that the multilevel storage rack for the longitudinal side storage of containers consists of any number of storage bays of a depth corresponding to a container width, on multiple levels several bays high, which are consecutively arranged in rows in the longitudinal direction along one aisle side and are each separated in the transverse direction by one aisle, and has storage and retrieval units that can be moved back and forth in the aisles and are designed with telescopic grabs that can be extended or retracted orthogonally to the aisle and can be raised and lowered for moving a container. The containers intended for storing in the bays of the storage modules are provided by transporters and/or intermediate transfer means, e.g. slides that after depositing of the containers by the transport vehicle, moves them to the access area of the storage and retrieval unit at a front side of the multilevel storage next to the aisles where they are picked up by the storage and retrieval devices and transported to bays with their narrow ends facing in the direction of the aisle.

Containers intended for retrieval from a bay are moved by the storage and retrieval unit with their longitudinal sides outward horizontally from the bay into the storage and retrieval unit and are then transported with their narrow end facing in the direction of the aisle directly to the end of the multilevel storage rack opposite the storage end and are made ready for transporting away. It should be noted here that the material flow has all degrees of freedom and that a static allocation of the ends is not stipulated, so that storing and retrieving procedures can take place from both ends of the multilevel storage rack.

The containers that during storing are moved horizontally with their longitudinal sides outward out of the storage and retrieval rack into the bay are there placed by a lifting movement of the storage and retrieval unit with their base corner sections on corner supports provided therefore in the bays.

With these storage and retrieval units that preferably can enter the aisles from both ends of the multilevel storage bay, any kind of access to every single container stored in the containers of the multiple-level storage modules is possible.

In one embodiment of the invention, the floor/aisle-bound storage and retrieval unit comprises a frame comprising vertical posts and head or foot beams connecting them together and of a height corresponding to the multiple-level multilevel storage bay.

For moving the storage and retrieval device a drive is advantageously integrated into the foot beams and is implemented by a wheel/rail connection usual in storage and retrieval units.

A preferred embodiment of the invention envisages that a hoisting device runs in guides of the vertical posts and comprises side supports consisting of spaced, parallel longitudinal beams opening upward in a forked or y-shaped manner and connected on both opposite fork ends with each other to form a frame, and to reinforce the hoisting device parallel struts are provided under the longitudinal beams that each extend from one foot end of one side support to the foot end of the other side support. The hoisting device formed in this way that due to its structure combining the two side supports can also be called a hoisting bridge always remains on the axis of the storage and retrieval unit during all required handling movements.

In accordance with the invention, for raising/lowing the hoisting device/hoisting bridge, a cable control device comprising a cable, a cable drum, pulleys, a hoist motor and hoist gears is provided that can exactly horizontally position the hoisting device/hoisting bridge relative to a bay at any level within the storage and retrieval unit.

The length of the hoisting device/hoisting bridge for picking up a container is designed in accordance with the largest occurring container length and the symmetrical width of the fork or y-shaped side supports in accordance with the standard container width, so that the largest outer dimensions of the hoisting device/hoisting bridge can be the same as the outer dimensions of the containers. Accordingly the multilevel storage rack can have storage locations for containers of different lengths and heights that are transported and maneuvered by the storage and retrieval units. The containers are, for example, standard containers corresponding to DIN-ISO-668 dimensions and ISO-6346 types.

A further embodiment of the invention envisages that two further stationary telescopic grabs spaced from one another on the longitudinal beams of the hoisting device/hoisting bridge are are spaced to bridge the smallest container length and, two further stationary telescopic grabs spaced correspondingly to the largest container length.

For storing or retrieving a standardized 20-foot container TEU (twenty-foot equivalent unit) the two inner telescopic grabs with the smallest spacing between them are used, whereas for storing and retrieving a standardized 40-foot container FEU (forty-foot equivalent unit) the two outer telescopic grabs with the greatest distance between them are used. The stationary telescopic unit are fastened with their basic housing to the underside of the longitudinal beams, and the two inner telescopic grabs are offset vertically from the outer telescopic grabs.

In accordance with a preferred embodiment of the invention it is envisaged that on inner sides of the longitudinal beams facing each other linear guides are arranged in which two telescopic grabs can be moved and through a movement can be positioned toward or away from each other in accordance with the length of the container in question. In this way, with only two telescopic grabs both 20-foot containers and also 40-foot containers or containers with other dimensions can be stored and retrieved or moved, for which, in accordance with one proposal of the invention, the displaceable telescopic grabs roll along the linear guides in the longitudinal beams on rollers arranged upright in holding or support blocks on their basis housings.

In accordance with the invention it is also envisaged that for each linear guide, two double roller arrangements are provided on each of the sides of the housing of the telescopic grabs. The thus resulting total of eight roller grabs allows secure and warp-free movement of the telescopic grabs within the linear guides.

One advantageous embodiment of the invention envisages that both the basic housing of the stationary telescopic grabs and also the basic housing of the displaceable telescopic grabs accommodates two extendable and retractable telescopic pusher arms, and an outer telescopic pusher arm runs with bilateral outer guide profiles on rollers of the basic housing and an inner telescopic pusher arm runs with bilateral rollers in inner guide profiles of the outer telescopic pusher arm.

The telescopic pusher arms are integrated into the basic housing in this way, are preferably displaceable by rack and pinion gearing, and allow the telescopic grabs to be designed in a compact manner so that neither the main housing nor the telescopic pushing arms when fully retracted in the basic setting project beyond the width of the hoisting device/hoisting bridge.

Additionally, seen in the direction of the longitudinal storage of the containers, the telescopic arms have front latches on the inner telescopic pushing arm, and rear latches on the outer telescopic pushing arm. The latches consist of so-called twistlock bolts that are standardized and engage in complementary openings on the upper side of the container.

It can also be envisaged that on the narrow side of a vertical post of the storage and retrieval unit a stage structure attached to the vertical post and the foot beam, is arranged for accommodating supply means for the hoisting device, the drive of the storage and retrieval unit and the displaceable telescopic grabs. The stage structure serves as a platform for, for example, switch and electrical boxes, cable drums, hoist motor and hoist gears as well as brakes and braking resistors, and the width of the stage structure is approximately identical to the width of the hoist device and the storage and retrieval unit.

BRIEF DESCRIPTION OF THE DRAWING

Further features and details of the invention are set out in the following description of embodiments of the invention shown in the drawing. In these.

SPECIFIC DESCRIPTION OF THE INVENTION

Figure 1:
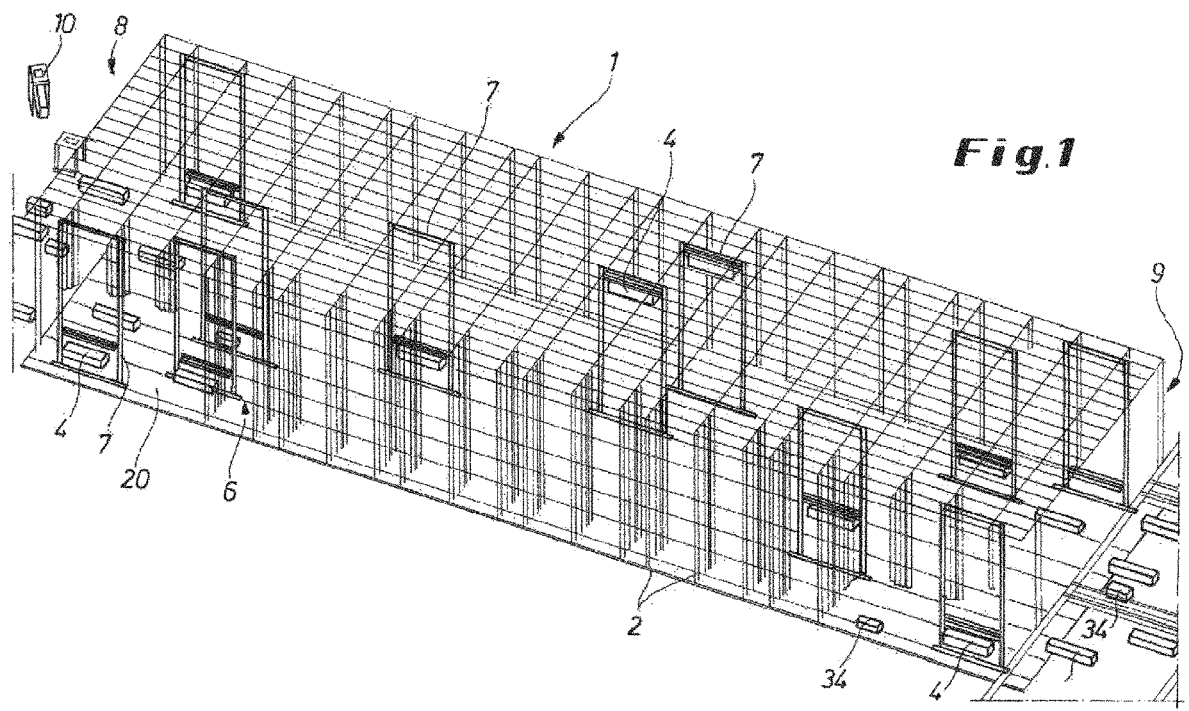
FIG. 1 is a perspective, simplified overall view of a multilevel storage rack with floor-based storage and retrieval units that are displaceable in the aisles.
Figure 3:
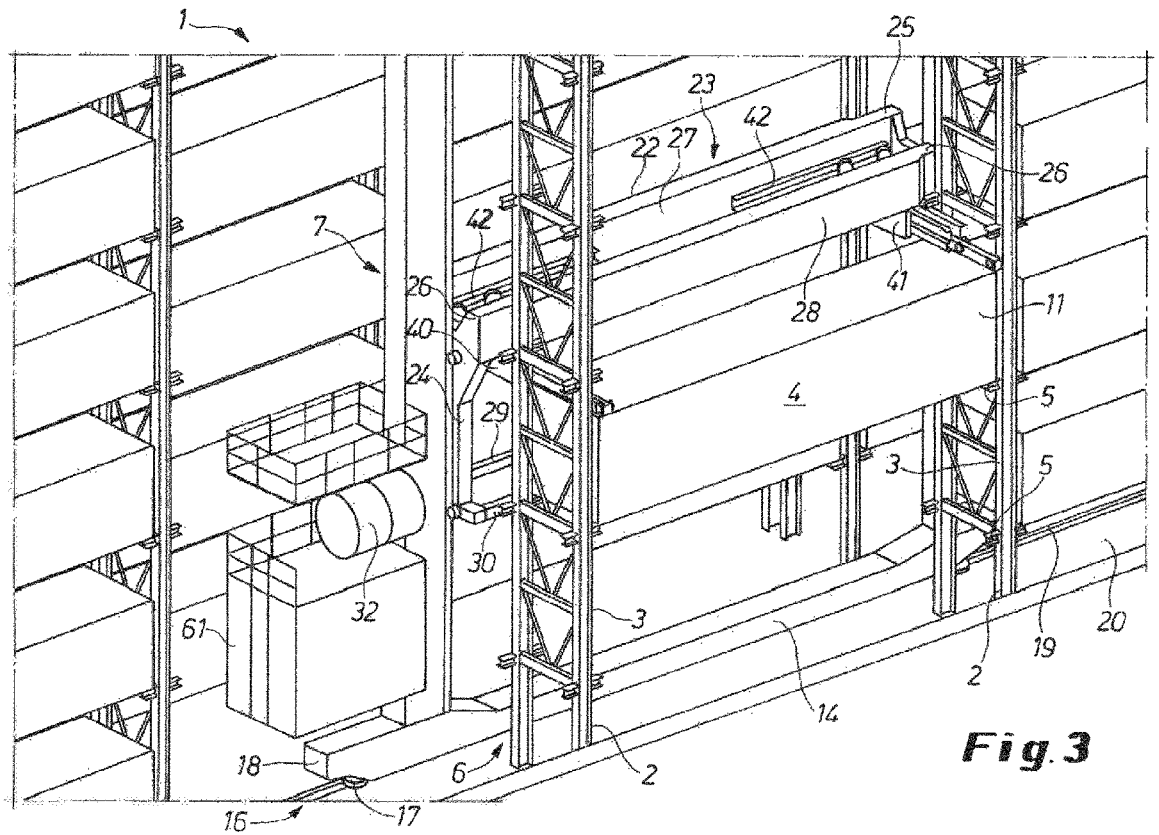
FIG. 3 is a perspective partial view of a detail of the multilevel storage rack in FIG. 1 with a storage and retrieval unit standing outward of a bay of a storage module with telescopic grabs for inserting a container into the bay.

FIG. 1 schematically shows a multilevel storage rack 1 comprising rows of storage modules 2 each with a vertical array of bays 3 for storing and retrieving containers 4, the bays 3 having corner supports 5 carrying the respective containers (see FIG. 3).

Between the storage module 2 are aisles 6 extending longitudinally along the entire length of the multilevel storage rack 1 and along which storage and retrieval units 7 can travel back and forth, the storage and retrieval units 7 being able to enter the aisles 6 from both ends 8 and 9 of the multilevel storage rack 1.

The containers 4 are fed to the intake end 8—and/or optionally the output end—of the multilevel storage rack 1 by transporters 10 and possibly intermediate transfer means (not shown) at a side next to the aisle 6 with their longitudinal axis extending parallel to the multilevel storage bays. There the containers 4 are picked up in a suspended position by the storage and retrieval units 7 and transported along the aisles 6 to a bay 3 of a storage module 2 into which they are placed with their longitudinal side 11 outward. In divergence from the illustrated embodiment and in dependence on the actual integration of the multilevel storage rack in a container terminal, storage and retrieval points, for example, can be located on the longitudinal sides of the multilevel storage bay.

A container retrieved from a bay 3 by the storage and retrieval unit 7 for removal from the storage rack 1 is transported via the aisle 6 to the output end 9 of the multilevel storage rack 1 and deposited there for outbound transport.

Figure 2:
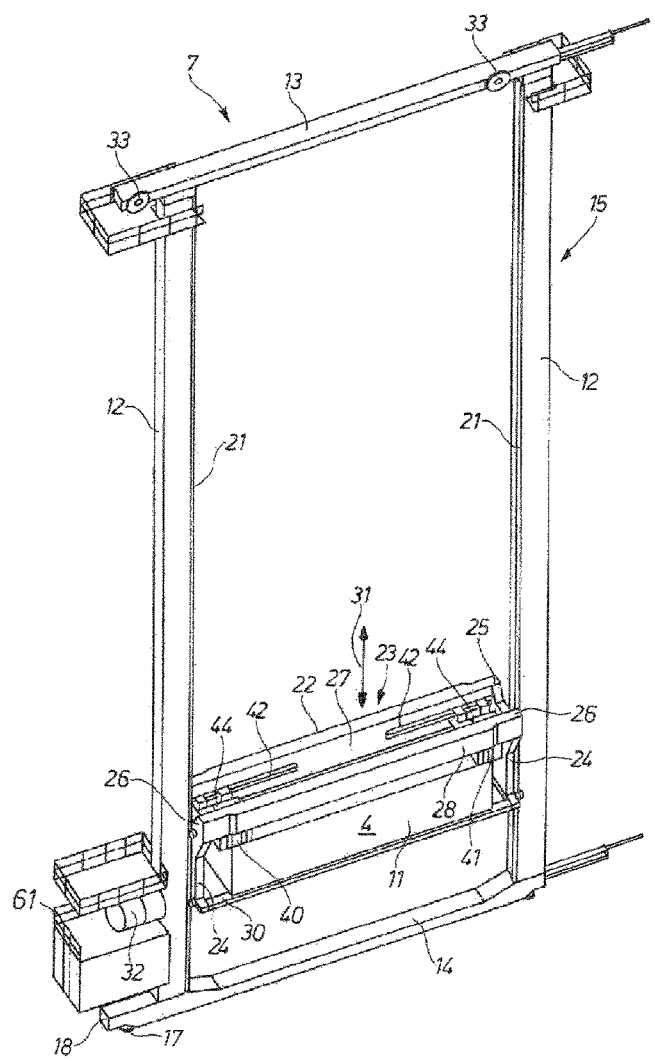
FIG. 2 is a perspective overall detail view of a storage and retrieval unit.

The storage and retrieval unit 8 shown in detail in FIG. 2 has a frame 15 that comprises vertical posts 12 and, connecting them, head and foot beams 13, 14 and is the same height as a multiple level storage module 2.

The storage and retrieval unit 7 can be displaced via rack and pinion gearing 16. A drive toothed wheel 17 is integrated into an end 18 of the foot beam 14 and the rack 19 in which it engages is mounted in a base 20 of the aisle 6 as is indicated in FIG. 3.

The vertical posts 12 have guides 21 in which a hoisting bridge 22 of a hoisting device 23 that consists of lateral forks 24 widening out upward and, connecting them at two opposite fork ends 25 and 26 to form a frame, spaced longitudinal beams 27 and 28 extending parallel to each other. To reinforce the hoisting device 23 at the lower end of the support forks 24 and bridging them are spaced parallel foot beams 29 and 30 (see FIGS. 4, 5 and 6).

For raising and lowering the hoisting bridge 22 in accordance with double arrow 31 there is a cable control device of which only the cable drum 32 and pulleys 33 on the head beam 13 of the storage and retrieval device 7 are shown.

The length of the hoisting bridge 22/the hoisting device 23 is designed for receiving the container 4 that has the largest occurring container length of, for example, 40 FEU (forty-foot equivalent unit). However, containers 34 that have the smallest occurring container length of, for example, 20 TEU (twenty-foot equivalent unit) should also be able to be held and transported by the hoisting device 23 (see FIGS. 5 and 6).

Figure 6:
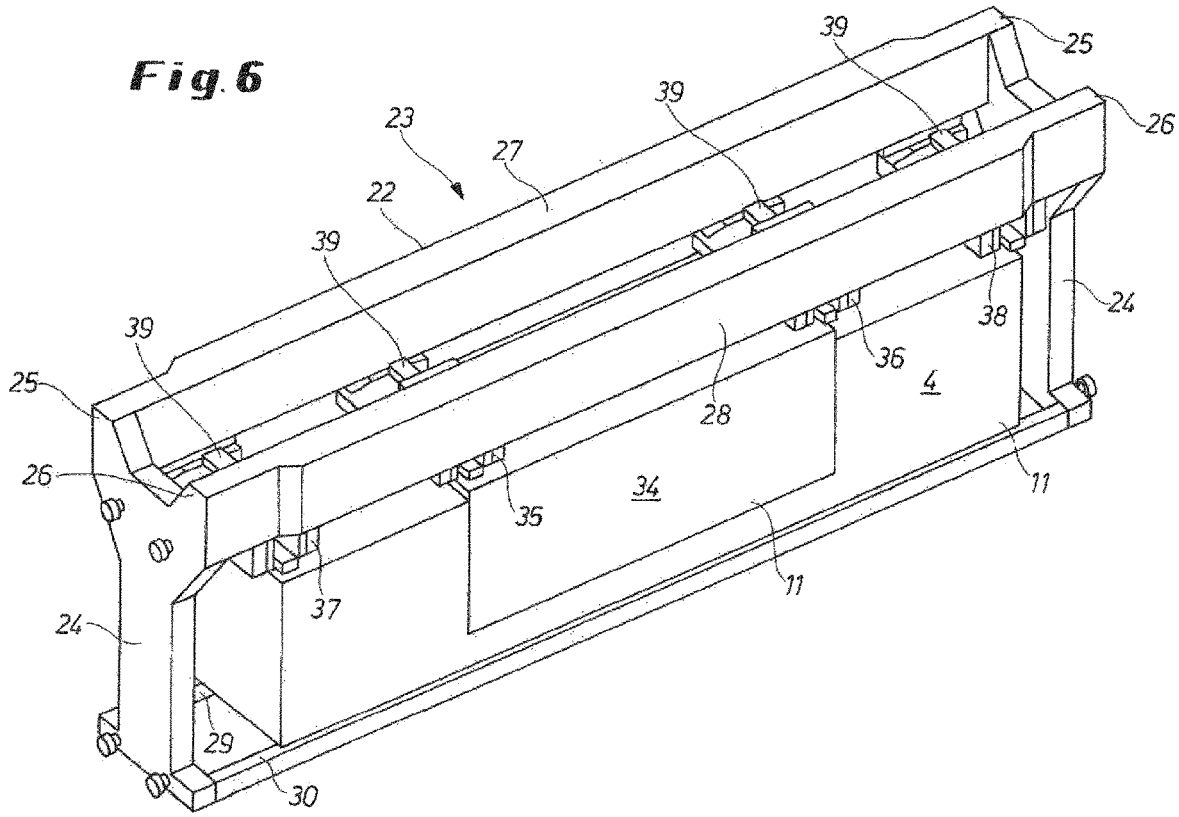
FIG. 6 is a perspective view like FIGS. 4 and 5 of a hoisting bridge with telescopic grabs fixed on longitudinal beams of the hoisting bridge of longitudinal dimensions corresponding to the smallest container and the largest container that from the start are arranged so that they can be locked on suspension points of the container.

As shown in FIG. 6, the longitudinal beams 27 and 28 of the hoisting bridge carry two inner stationary telescopic grabs 35 and 36 for holding the shorter container 23 and two outer telescopic grabs 37 and 38 set further apart from one another for holding the longer container. The stationary telescopic grabs 35 to 38 have respective housings 39 secured to the undersides of the longitudinal beams 27 and 28, with the inner ones offset vertically relative to the outer ones.

Figure 4:
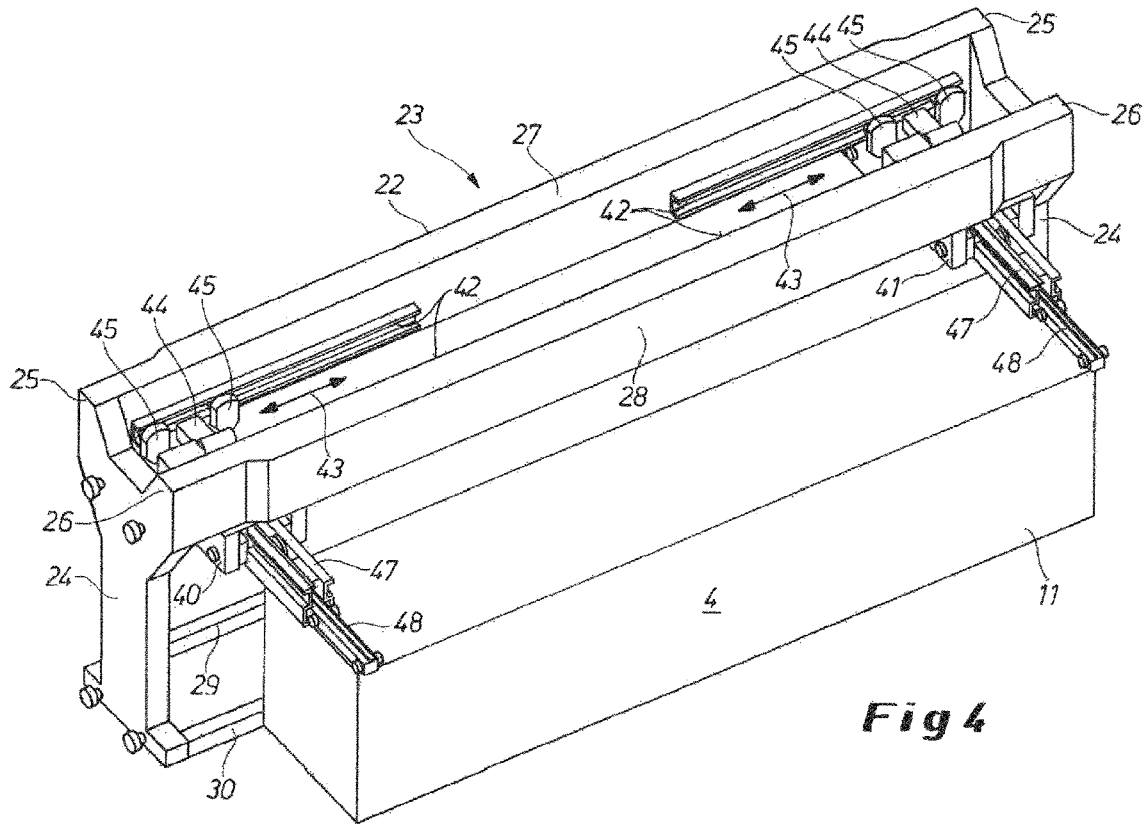
FIG. 4 is a perspective partial view of a detail of the storage and retrieval unit in FIG. 3 with its hoisting bridge with a container suspended on the extended telescopic grabs.
Figure 5:
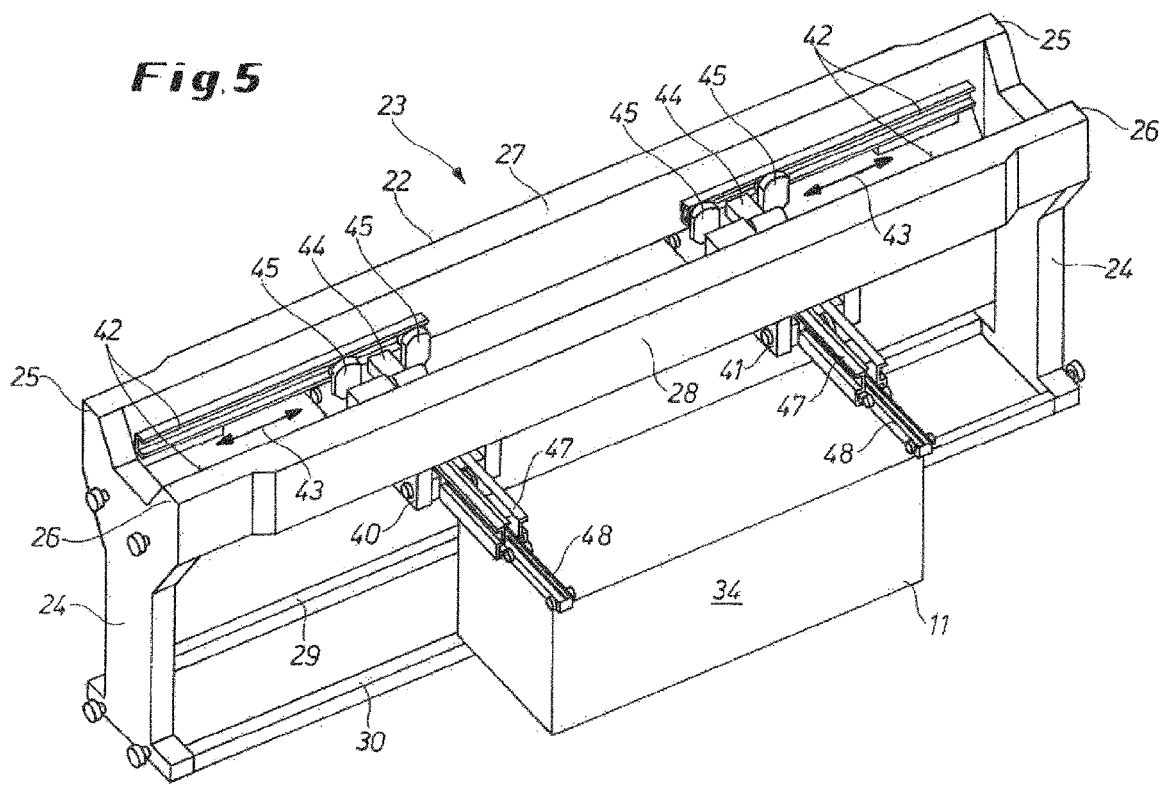
FIG. 5 is a detail view like FIGS. 3 and 4 showing the hoisting bridge of the storage and retrieval unit with in this case, compared with FIG. 4, a container with smaller longitudinal dimension suspended and locked by the telescopic grabs, for which the telescopic grabs have been moved toward each other in linear guides of the longitudinal beams of the hoisting bridge.
Figure 7:
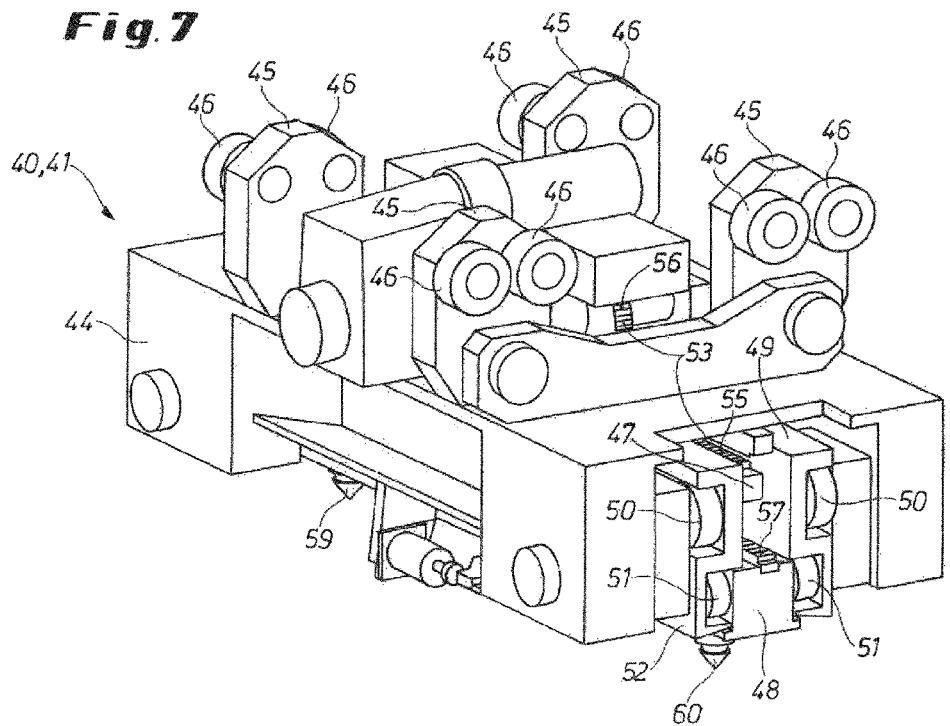
FIG. 7 is a perspective detail view of a telescopic grab in the starting position with retracted telescopic pusher arms.

In accordance with a further embodiment shown in FIG. 5, only two telescopic grabs 40 and 41 are provided that can be displaced in linear guides 42 of the longitudinal beams 27 and 28 and can thus be positioned by movement toward or away from each other—double arrow 43—corresponding to the length of the container 34 or the container 4 (see FIGS. 2, 3 and 4). The displaceable telescopic grabs 40 and 41 are held in the linear guides 42 of the longitudinal beams 27 and 28 via double rollers 46 on their housings 44 on supports 45 (see FIG. 7).

Figure 8:
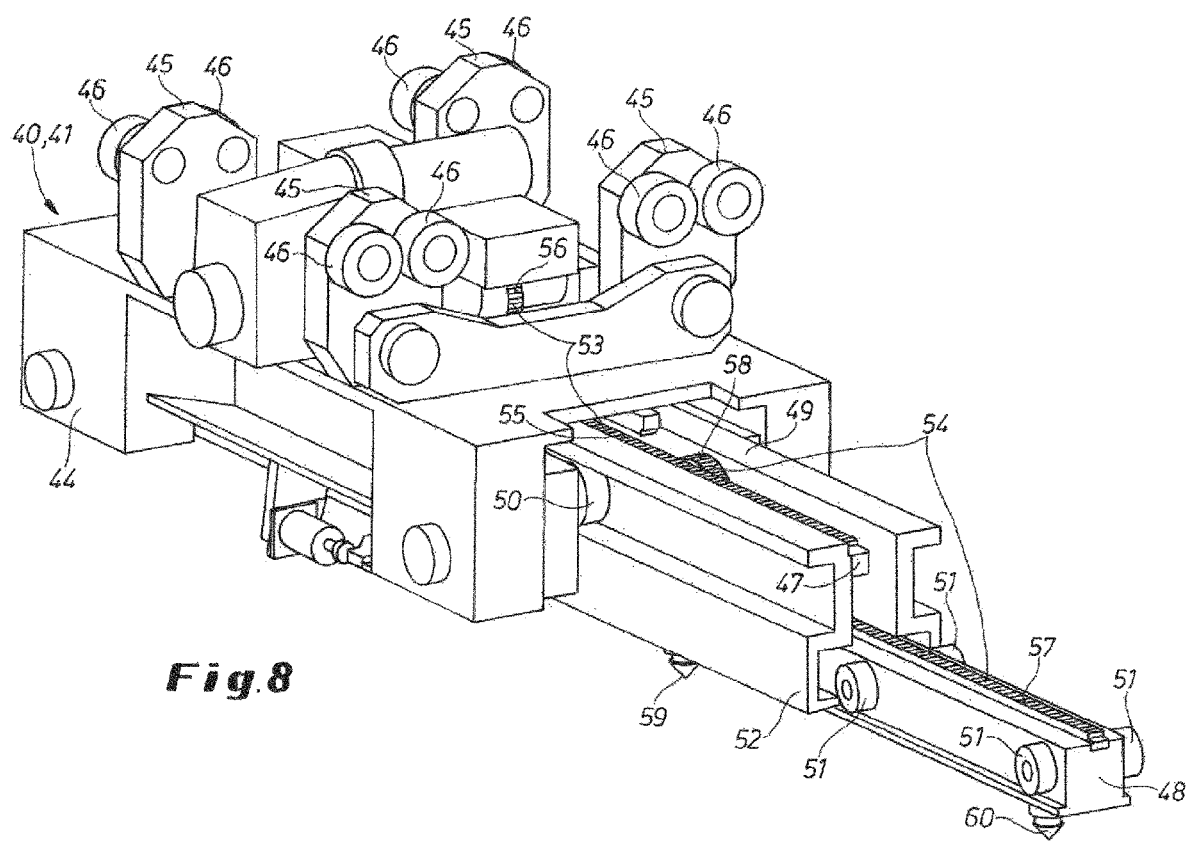
FIG. 8 shows the telescopic grab of FIG. 7 with extended telescopic pusher arms.

Both the basic housing 39 of the stationary telescopic grabs 35 to 38 and also the basic housing of the displaceable telescopic grabs 40 and 41 accommodate an outer telescopic pusher arm 47 and an inner telescopic pusher arm 48. The outer telescopic pusher arm 47 runs with bilateral outer guide profiles 49 on rollers 50 of the basic housing 39 and 44, and the inner telescopic pusher arm 48 with bilaterally arranged rollers 51 in inner guide profiles 52 of the outer telescopic pusher arm 47 (see FIGS. 7 and 8).

The extension and retraction of the outer and the inner telescopic pusher arms 47 and 48 takes place via rack and pinion gearing 53 and 54. In the rack and pinion gearing 53 for the outer telescopic pusher arm 47 a rack 55 is provided between the outer guide profiles 49, while a pinion 56 meshing with the rack 55 is on the upper side of the basic housing 39 and 44. In the case of the rack and pinion gearing 54 for the inner telescopic pusher arm 48 a rack 57 is provided on the telescopic pusher arm 48 itself, and the pinion 58 engaging in the rack 57 is between the outer guide profiles 49 of the outer telescopic pusher arm 47.

For locking to the containers 4, 34 the telescopic pusher arms 47 are 48 are each fitted with so-called twistlock bolts on their underside.

The storage and retrieval unit 7 is also designed with a stage structure 61 on the end 18 of the foot beam 14. The stage structure 61 accommodates the equipment required for the drive 16 of the storage and retrieval unit 7 and for controlling the telescopic grabs 35 to 38 and 40, 41.

FIGS. 1 to 4 show the procedure for storing a container 4 in the multilevel storage rack 1.

With the outer and inner telescopic pusher arms 47, 48 fully retracted, the storage and retrieval unit 7 is moved by its rack and pinion gearing 16 in the aisle 6 to the intake end 8 of the multilevel storage rack 1 in order to there pick up a container 4 provided at a side next to the aisle 6 with its longitudinal axis extending parallel to the multilevel storage rack 1. For this the telescopic grabs 40, 41 are displaced via their double rollers 46 in the linear guides 42 in accordance with the length of the container 4 to be picked up and the outer and inner telescopic pusher arms 47, 48 are extended via their rack and pinion gearing 53, 54 over the container and lowered to over the container's suspension points. The front and rear twistlock bolts 59, 60 then lock the container to the outer and inner telescopic pusher arms 47, 48.

After locking, the outer and inner telescopic pusher arms 47, 48 with the suspended container are lifted by the hoisting bridge 22 and are retracted by the rack and pinion gearing 53, 54 into the storage and retrieval unit 7 or under the hoisting bridge 22 unit so that the container assumes a suspended or transfer position in the storage and retrieval unit 7 that is flush with the plane of the aisle 6.

The rack and pinion gearing displaces the storage and retrieval device 7 in the aisle 6 to a bay 3 to be occupied in a storage module 2 and the hoisting bridge 22 with the suspended container 4 is positioned for the horizontal, telescopic handling procedure. The container 4 can now be moved by extension of the outer and inner telescopic pusher arms 47, 48 with its longitudinal side 11 outward into the bay 3 and placed there by lowering the hoisting bridge 22 on to the corner supports 5.

After loosening the locking of the container 4 through unlocking the twistlock bolts 59, 60, the outer and inner telescopic pusher arms 47, 48 are raised and the rack and pinion gearing 53, 54 are moved into their retracted starting position under the hoisting bridge 22 so that the storage and retrieval unit 7 is ready for a new storage and/or retrieval procedure.

On retrieving a container 4, 34 from a bay 3 of a storage module 2 by the storage and retrieval unit 8, the container is then taken to the output end 9 of the multilevel storage rack 1, the fully automatically controlled drive, hoisting and telescoping and locking movements are the reverse of the storing procedure described above.

We claim:

1. A method of storing and retrieving longitudinally elongated containers in multilevel storage racks of a transfer facility by storage and retrieval units that can travel longitudinally in aisles extending parallel to respective rows of transversely open storage bays of the multilevel storage racks, the method comprising the steps of sequentially:

supporting the containers in the bays only at corners of the containers on corner supports of the bays;

telescopically extending and inserting the containers transversely with raisable and lowerable telescopic grabs of the storage and retrieval unit into the bays; and telescopically retracting the grabs and removing the containers from the bays in a direction transverse to longitudinally extending sides of the containers outward into a transfer position not projecting beyond a footprint of the storage rack and retrieval unit.

2. The method according to claim 1, further comprising the step of:

suspending the containers from above on the telescopic grabs for when inserting the containers into the bays and/or when removing the containers from the bays.

3. The method according to claim 1, wherein a one of the containers is inserted into a one of the bays by the steps of sequentially:

feeding the one container at an entrance end of the multilevel storage rack the with a longitudinal axis of the one container extending parallel to the multilevel storage rack on a side next to the aisle, moving a storage and retrieval unit that can travel in the aisle to outward of the one container and then picking up the one container by sequentially telescopically extending the grabs to positions above respective suspension points on the one container lowering the grabs to the respective suspension points on the one container, locking the grabs to the respective suspension points, and raising the grabs and of the one container into a suspended position, thereafter via an inverse handling movement retracting the telescopic grabs with the suspended one container back into the storage and retrieval unit until the container is suspended in the transfer position in the storage and retrieval unit flush with a plane of the aisle, displacing the storage and retrieval unit along the aisle to outward of the bay to be occupied, and raising the telescopic grabs vertically when a higher level aligned with the bay to be occupied, inserting the container into the one bay through a handling movement of the telescopic grabs orthogonal to the aisle, setting the container with its corners on the corner supports on vertical posts of the storage rack delimiting the bay to be occupied, thereafter unlocking the container from the unit such that the container is supported only at its corners on the respective corner supports, and after unlocking of the container, raising the telescopic grabs and moving the telescopic grabs back into a retracted starting position to leave the one container only supported on the corner supports.

4. An apparatus for storing, retrieving, or moving containers in multilevel storage racks of a transfer facility, the containers being transported as well as stored, retrieved or moved by storage and retrieval units that can travel in aisles extending parallel to respective rows of storage bays of the multilevel storage rack, the multilevel storage rack for longitudinal side storage of containers having a plurality of storage bays of a depth corresponding to a container width and on multiple levels several bays high that are consecutively arranged in rows extending longitudinally of the containers along one aisle side and with the rows separated transversely by one aisles, the apparatus comprising:

storage and retrieval units that can move back forth in the aisles and that have raisable and lowerable telescopic grabs that can be extended and retracted orthogonally to the aisle for suspending a container; and corners supports in each of the bays for supporting the containers only at corners of the containers.

5. The apparatus according to claim 4, wherein the storage and retrieval unit has a frame that comprises vertical posts connected by head and foot beams and that is of a height corresponding to the storage rack.

6. The apparatus according to claim 5, further comprising:

a drive integrated into the foot beams for moving the storage and retrieval unit along a floor on which the racks stand.

7. The apparatus according to claim 4, further comprising:

a hoisting device running in guides of vertical posts of the rack and having Y-shaped forks widening upward with spaced and parallel longitudinal beams connecting opposite upper ends of the forks to form a frame, and for reinforcing the hoisting device below the longitudinal beams, spaced and parallel struts that each extend from a foot end of one support fork to the foot end of an adjacent one of the other support forks.

8. The apparatus according to claim 7, wherein raising and/or lowering of the hoisting device takes place via a cable control device comprising a cable, a cable drum, pulleys, a hoist motor, and hoist gears.

9. The apparatus according to claim 7, wherein a length of the hoisting device holding a container is equal to a largest available container length and a symmetrical width of the support forks in accordance with a standardized container width, so that larger outer dimensions of the hoist device coincide with outer dimensions of the containers.

10. The apparatus according to claim 7, further comprising:

two stationary outer telescopic grabs spaced from each other corresponding to a largest container length, and two further stationary inner telescopic grabs on the longitudinal beams of the hoisting device bridging a space between them in accordance with a smallest container length.

11. The apparatus according to claim 10, wherein the stationary telescopic grabs have respective housings fastened to undersides of the longitudinal beams.

12. An apparatus for storing, retrieving, or moving containers in multilevel storage racks of a transfer facility, the containers being transported and retrieved by storage and retrieval units that can travel in aisles extending parallel to respective rows of storage bays of the multilevel storage rack, the multilevel storage rack having for longitudinal side storage of containers a plurality of the storage bays of a depth corresponding to a container width and on multiple levels several bays high that are consecutively arranged in rows longitudinally of the bays along one aisle side and are each separated transversely by one aisle, the apparatus comprising:

storage and retrieval units movable in the aisles and that have raisable and lowerable telescopic grabs that can be extended and retracted orthogonally to the aisle for suspending a container;

corners supports in each of the bays for supporting the containers only at corners of the containers;

a hoisting device running in guides of vertical posts of the rack and having Y-shaped forks widening upward with spaced and parallel longitudinal beams connecting opposite upper ends of the forks to form a frame;

spaced, parallel struts that each extend from a foot end of one support fork to the foot end of another of the support forks for reinforcing the hoisting device below the longitudinal beams;

two stationary outer telescopic grabs spaced from each other corresponding to a largest container length;

two stationary inner telescopic grabs on the longitudinal beams of the hoisting device bridging a space between them in accordance with a smallest container length;

respective housings on the stationary telescopic grabs and fastened to undersides of the longitudinal beams; and inner guides on two facing inner sides of the longitudinal beams in which the two telescopic grabs can be displaced and positioned on movement toward or away from each other in accordance with a length of the relevant container.

13. The apparatus according to claim 12, further comprising:

linear guides of the longitudinal beams in which the respective displaceable telescopic grabs roll with rollers arranged upright in supports on their respective housings.

14. The apparatus according to claim 13, wherein
for each linear guide two of the rollers are provided on sides of the housings.

15. The apparatus according to claim 12, wherein
both the housings of the stationary telescopic grabs as well as the housings of the displaceable telescopic grabs have retractable and extendable inner and outer telescopic pusher arms, the outer telescopic pusher arms each running with bilateral outer guide profiles on rollers of the respective housing and the inner telescopic pusher arms running with laterally arranged rollers in inner guide profiles of the outer telescopic pusher arm.

16. The apparatus according to claim 15, further comprising;
rack and pinion gears for moving the telescopic pusher arms.

17. The apparatus according to claim 15, wherein
the telescopic pusher arms, seen in the direction of the longitudinal storing of the container have a front latch on the inner telescopic pusher arm and area latch on the outer telescopic pusher arm.

\* \* \* \* \*